Oct. 25, 1932.  J. M. MacLEAN  1,884,780
RESILIENT CONNECTION
Filed Nov. 11, 1930

INVENTOR
JAMES M. MACLEAN.
BY
ATTORNEY.

Patented Oct. 25, 1932

1,884,780

UNITED STATES PATENT OFFICE

JAMES M. MacLEAN, OF OAKLAND, CALIFORNIA, ASSIGNOR TO CALREW INCORPORATED, OF SAN FRANCISCO, CALIFORNIA, A CORPORATION OF NEVADA

RESILIENT CONNECTION

Application filed November 11, 1930. Serial No. 494,870.

This invention relates to resilient connections between two relatively movable members. As shown, the said connections are between the inner and outer parts of a wheel, such, for example, as a car wheel. In this case, the object of the invention is to produce a wheel which has easy riding qualities, which absorbs or reduces excessive shocks, which is comparatively silent in operation, and which can be quickly disassembled when it becomes necessary or desirable to replace a worn rim.

As is well known, the ordinary car wheel, whether it be on a street or railway car, is rigidly connected with its axle. Any shock to the rim portion of the wheel is transmitted to the axle and, through the latter, to the car body. A rough track, therefore, produces a jolting of the car; and the shocks thus transmitted not only produces discomfort to the passengers but rack the car and cause rapid depreciation. Moreover, since the vibrations are transmitted to the car it acts as a sort of resonator, giving rise to much noise which, particularly in the case of street-cars in crowded thoroughfares, is a matter of great annoyance. These objectional features have been largely overcome by the use of circular rubbers interposed in housings or pockets formed in the adjacent faces of the inner and the outer parts of the wheels.

In my use of such rubbers in wheels of the general type herein disclosed, except that they were used on trucks, I discovered that the rubbers turned in their pockets as the wheels rotated. Since these rubbers were required to withstand excessive stresses, due not only to the gravity load but to the transmitted torque, the friction of the rubbers within their pockets was so great that the rubbers were rapidly worn away and were sometimes torn and rendered unfit for further service. By my invention, these rubbers are permitted to turn freely so that they are required to withstand a shearing stress only. Being thus relieved of friction, they last almost indefinitely or as long as many of the other parts of the wheel and car.

While I have disclosed a specific form in which the invention is embodied, I realize that the details of the structure disclosed may be varied in some degree without departing from the spirit of my invention, and I wish it understood that the claims herein are not intended to be limited to such details any farther than their specific terms require.

Figure 1:
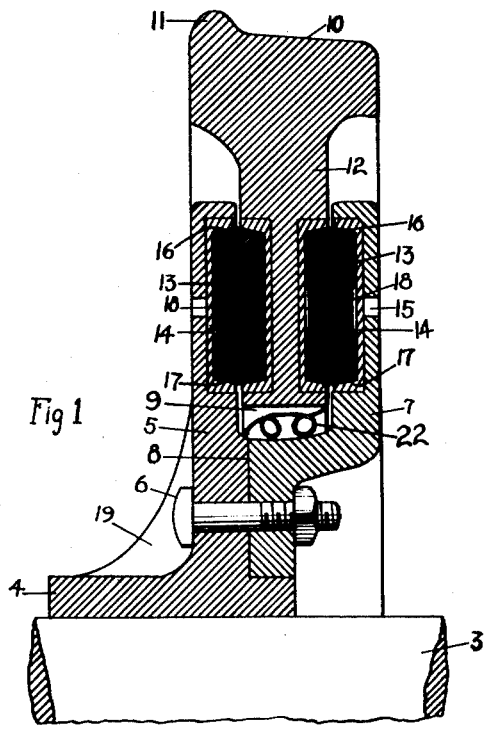
Figure 2:
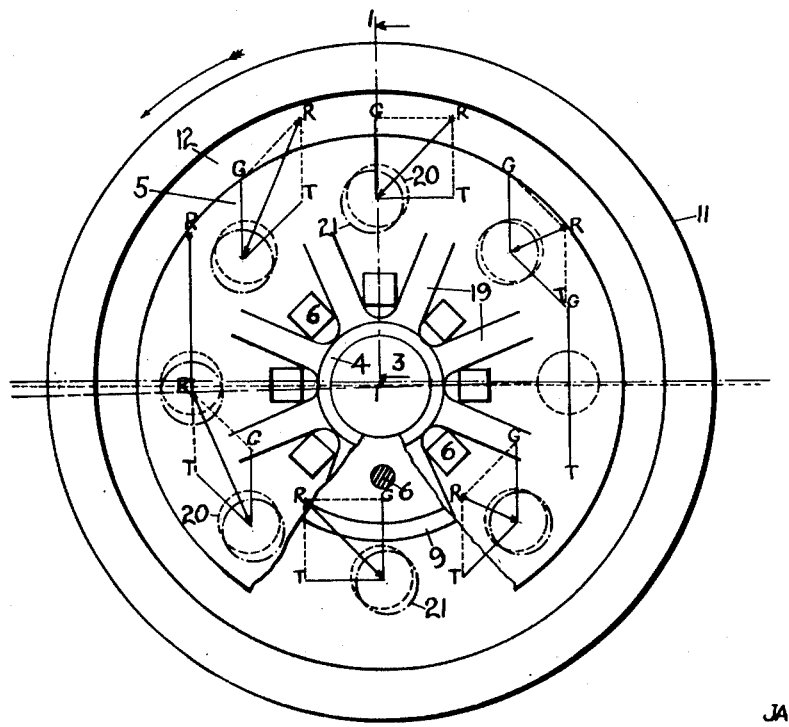

In the drawing, Fig. 1 is a vertical section taken centrally through the upper half of a wheel, as on the line 1—1 of Fig. 2, and Fig. 2 is a side elevation of a wheel, a portion of the same being broken away more clearly to show the details of my preferred construction. Fig. 2 further indicates graphically the forces acting upon the rubbers and the manner in which the several rubbers are distorted.

In the drawing the axle is designated 3, Fig. 1 showing only a portion of the upper half thereof. Secured to the axle so as to turn therewith is the hub portion 4 of the central part of the wheel. Extending outwardly from this hub portion, and preferably integral therewith, is the main side plate 5, the same being disk-shaped, as appears from Fig. 2. Mounted upon the hub 4, and attached to the plate 5 by means of the bolts 6, is the auxiliary side plate 7, the same being in the general form of an annulus with its outer diameter equal to that of the plate 5 and its internal diameter substantially equal to that of the hub about which it fits. The plates 5 and 7 are in side by side contact at 8 in the region about the bolts 6 so that the plates are rigidly attached together. A space 9 is left between the outer portions of the side plates for a purpose hereinafter set forth. To provide for this space, the plate 7 is projected laterally beyond the bolts 6 as shown. Obviously, both of the plates could be offset in this manner but in opposite directions so that the central part of the space between them would be bisected by the plane through 8, or any other desired arrangement of the plates could be adopted in order to provide this space.

The outer portion of the wheel has a rim or tread portion 10, a flange 11 for engagement with the rail and a web 12 which is in a plane substantially parallel with the planes of the side plates and which extends into the space 9 between said plates. Preferably, the thickness of the web 12 is slightly less than the width of the space 9 so that there will be no substantial side pressure between these parts as the wheel passes about a curve or the car body sways. The web 12 does not extend to the full depth of the space 9 since the side plates and web have relative movement in a radial direction, as will be seen.

Within pockets provided in the side plates and the web respectively are a series of elastic elements 13. As indicated in the drawing and as preferred, these elements are made of rubber or of rubber composition. The material used in making up these elements and the degree of resiliency obtained will depend upon the particular wheel in which the elements are to be installed. Where smooth riding is of no particular importance, they will preferably be made of some suitably hard material that is less elastic or less easily distorted than rubber or rubber composition. In all cases, the elements will, of course, be more elastic or resilient than is the material of the wheel proper, as otherwise the wheel would be as jolty and noisy as the ordinary solid wheel. Hereinafter, these elements will be referred to as rubbers. They are disk-shaped, being circular but flattened at their sides, as is clearly indicated in Fig. 1. Further, their outer surfaces taper somewhat from the center outwardly, for a purpose hereinafter described. These rubbers form the resilient connections between the inner and outer portions of the wheels. The rubbers do not contact directly with either the side plates or the web, but each is housed within a pair of metallic members 14 which are cup-shaped to receive one side of the respective rubber and to fit about the latter almost but not quite to its median plane. That is to say, the inner surface of the cup rim fits the complementary tapered outer surface and the bottom of the cup fits the side of the rubber. Preferably, the outer surface of the cup is cylindrical and fits within a shallow cylindrical recess in the respective plate or web, thus forming a liner for the recess. By this construction, the liners 14 are permitted to turn freely within their respective recesses. Thus, although the rubbers may bear with great pressure upon the liners and would produce a friction which would be destructive if the rubbers turned within the liners, the latter may turn within their recesses with relatively little resistance. The liners may be made of any material having the requisite strength, but are preferably made of a metal which will produce the minimum friction while turning within their recesses. Preferably the side plates 5 and 7 are provided with small apertures 15 at the axial centers of the recesses through which lubricating material may be introduced if found necessary or desirable.

With the wheel upon its rail, the liners within the recesses of the web 12 are held against vertical movement. The weight of the car being upon the axle 3, the axle and the side plates are depressed, thus carrying downwardly to a slight extent the liners 14 of the side plates. This downward movement is resisted by the rubbers, the maximum stresses being from the lines of contact 16 at the tops of the rubbers and extending diagonally through the rubbers to the lines of contact 17 at the bottoms thereof. In order to withstand this stress most effectually, the tapered contacting surfaces of the liners and rubbers at the lines 16 are parallel with the respective contacting surfaces at the lines 17, and the rubbers are of such diameter that lines perpendicular to the tapered surfaces at their central zones pass through the centers of the respective rubbers. By this arrangement, there is little tendency for the rubbers to press against the bottoms of the liners. On each side and at the center the rubbers are preferably depressed at 18 so that they can not bear frictionally against the bottoms of the cups at their centers. Further, these depressions provide spaces into which the rubber may flow when distortion occurs. As many sets of the rubbers 13 are employed as may be considered necessary for the particular wheel within which they are placed. In Fig. 2, I have indicated eight sets spaced equidistantly in a row about the center. To strengthen the wheel, the main side plate 5 is provided with reinforcing ribs 19 which radiate from the hub 4 and extend outwardly to regions opposite the spaces between the adjacent rubbers. The bolts 6 extend through the side plates between these ribs and the latter serve to hold the bolt heads from turning when the nuts are tightly applied.

If the only stress to which the rubbers are subjected were that due to gravity, they would be distorted on their upper and their lower edges only, and they would take a slightly elliptical form with their major axes horizontal. If, on the other hand, the only stress to which the rubbers are subjected were that due to the torque, they would be distorted in directions which are perpendicular to the radii of arcs drawn from the center of the wheel and passing through the centers of the rubbers. But the rubbers are subjected to both of these stresses acting simultaneously and at different angles toward their centers, and the liners of the side plates will be moved in the directions of the resultants of these forces. If it be assumed that the wheel of Fig. 2 is to be turned anti-clockwise, as indicated by the arrow, and if it be further assumed that the torque stress upon each rubber is exactly equal to the gravity stress upon that rubber, the several rubbers will be distorted in the manner graphically shown in Fig. 2, in which the lines G represent the gravity stress, the lines T represent the torque stress and the lines R represent, both in intensity and direction, the resultants of these stresses. In Fig. 2 the circles appearing in dotted lines at 20 represent the positions of the liners of the recesses in the web 12, while the dot-and-dash circles 21 represent the positions of the liners in the recesses of the side plates. The oval-like spaces about the centers of these circles represent the shapes of the distorted rubbers. The rubbers of the pair farthest to the right in Fig. 2 are not distorted since the gravity and torque stresses acting upon them are equal and in opposite directions. At the pair farthest to the left, the gravity and torque stresses are equal and in the same direction so that the distortion of the rubbers of that pair is at its maximum. Between these two pairs of rubbers the distortion varies both in intensity and direction, as indicated by the resultant lines R and by the shapes of the rubbers. As stated, a rubber at the extreme right is undistorted but no sooner is it moved upwardly then a resultant of the forces acts to distort it; and this distortion gradually increases until the wheel has made a half rotation, after which it gradually diminishes until the rubber comes back to its starting point where the resultant again becomes zero. As will be noted, while the wheel is making one complete rotation the resultant has swept about through 180 degrees only. Since the liners may turn readily, they turn with their respective resultants and so make a half rotation while the wheel is making a complete rotation. There is therefore a relative movement of rotation between the liners and the recesses within which they turn, and the liners permit this relative rotation and save the rubbers from wear and from destructive tortional stresses.

In the usual electric railway systems, the current for the motor flows through the wheel into the rail. In a wheel embodying my invention the rubbers insulate the rim portion from the hub or axle portion. I therefore provide one or more electric conductors between the web 12 and side plate 5. This conductor may be of any suitable character but I have shown a coiled wire 22 in the space 9, one end of which is soldered or otherwise attached to the web and the other end similarly attached to the plate.

As is well understood, the wear of an ordinary street or railway car-wheel comes upon the rim or tread portion. The same is true of a wheel embodying my invention. The wear of the side plates about the liners 14 is practically nil; but the wear between the rim and rail is substantial and the outer part of the wheel requires replacement from time to time. That is one of the practical advantages of my invention, since all that is necessary in substituting a new rim portion is to jack up the axle, remove the nuts from the bolts 6, take off the auxiliary plate 7 and the worn rim, apply the new rim portion with the liners and rubbers in place, put back the auxiliary plate and bolt it in place.

While my invention is particularly well adapted for use in resilient wheels wherein the movement between the connected members is rotative, it is not limited thereto. Where the connected members are intended to have a relative movement in a linear direction only, as in a hangar connecting an automotive engine with its chassis frame, the vibrations tend to cause the rubbers to turn and it is advantageous that they be permitted to turn freely, since all parts of the rubbers are thus permitted to come into the lines of greatest stress and any wear will be distributed equally about the same. Therefore, in such structures it is desirable to mount the rubbers in liners as shown and described.

Having thus described my invention, I claim:

1. A resilient connection between two movable parts disposed in substantially parallel planes and each part having a circular recess, the recesses being in normal axial alinement, said connections comprising liners in said recesses and a resilient element housed within said liners, said elements fitting the liners and frictionally engaging the same to prevent relative rotation between it and the liners and the liners having free rotation within their respective recesses.

2. A resilient connection as set forth in claim 1 in which the recesses are cylindrical and the resilient element is a rubber.

3. A resilient connection as set forth in claim 1 in which the resilient element is a circular disk of rubber having its perimeter tapered from the median plane outwardly, the angle of the taper and the diameter of the rubber being such that lines perpendicular to the tapered surfaces at their central zones pass substantially through the center of the rubber.

4. A resilient connection between two relatively movable parts comprising a pair of parallel and spaced side members, said members being provided with circular recesses in their facing sides, a plate parallel with said members and projecting into the space between the latter, said plate being provided with circular recesses in its opposite faces in normal alinement with the recesses in the side members, circular resilient elements between the side members and the plate, and circular metallic liners fitting within said recesses and housing the said resilient elements whereby, as the parts move relatively due to vibration, the liners turn within their recesses, for the purpose specified.

5. A resilient connection between two relatively movable parts comprising a pair of parallel and spaced side members, said members being provided with cylindrical recesses in their facing sides, a plate parallel with said members and projecting into the space between the latter, said plate being provided with cylindrical recesses on its opposite faces in normal alinement with the recesses in the side members, disk-shaped rubbers between the side members and the plate, and cylindrical metallic liners fitting within said recesses and housing the said rubbers whereby, as the parts move relatively due to vibration, the liners turn within their recesses, for the purpose specified.

6. A resilient wheel having a hub portion and a rim portion, a pair of spaced and parallel side plates carried by the hub portion, a web projecting inwardly from the rim portion and extending into the space between the side plates, said side plates and web being provided with circular recesses in their facing sides, the recesses in the side plates being coaxial with the recesses in the adjacent sides of the web, circular liners having free rotation within the respective recesses, and resilient elements housed within the liners of the side plates and the complementary liners of the web, said elements fitting the liners and frictionally engaging the same whereby, as the wheel rotates, the liners are caused to turn within their respective recesses.

7. A resilient wheel having a hub portion and a rim portion, a pair of spaced and parallel plates carried by the hub portion, a web projecting inwardly from the rim portion and extending into the space between the side plates, said side plates and web being provided with cylindrical recesses in their facing sides, the recesses in the side plates being coaxial with the recesses in the adjacent sides of the web, cylindrical liners for free rotation within the respective recesses, and disk-shaped rubbers housed within the liners of the side plates and the complementary liners of the web, said rubbers fitting the liners and frictionally engaging the same whereby, as the wheel rotates, the liners are caused to turn within their respective recesses.

8. A resilient wheel having a hub portion and a rim portion, a pair of spaced and parallel side plates carried by one of the said portions, a web projecting inwardly from the other portion into the space between the side plates, said side plates and web being provided with cylindrical recesses in their facing sides, the recesses in the side plates being coaxial with the recesses in the adjacent sides of the web, cylindrical liners for free rotation within the respective recesses, and disk-shaped elements housed within the liners of the side plates and the complementary liners of the web, said elements having their perimeters tapered from the centers outwardly and fitting the liners to engage the same frictionally and cause the liners to rotate in their cylindrical recesses as the wheel rotates.

9. A resilient wheel having a hub portion and a rim portion, a pair of spaced and parallel side plates carried by the hub portion, a web projecting inwardly from the rim portion into the space between the side plates, said side plates and web being provided with cylindrical recesses in their facing sides, the recesses in the side plates being coaxial with the recesses in the adjacent sides of the web, cylindrical liners for free rotation within the respective recesses, and disk-shaped rubbers housed within the liners of the side plates and the complementary liners of the web, said rubbers having their perimeters tapered from the centers outwardly and fitting the liners to engage the same frictionally and cause the liners to rotate in their cylindrical recesses as the wheel rotates.

10. A resilient wheel as set forth in claim 9 in which the angle of the taper of the rubbers on each side and the diameter of the rubbers are such that lines perpendicular to the tapered surfaces at their central zones pass substantially through the centers of the rubbers.

11. A resilient wheel as set forth in claim 9 in which the rubbers are provided with depressions on their sides, for the purpose specified.

12. A resilient wheel as set forth in claim 9 in which the side plates are provided with apertures leading to the recesses through which lubricant may be applied to the recesses and liners.

13. A resilient connection between two relatively movable parts comprising a pair of spaced and relatively movable metallic members, each of said members being provided with a circular recess in its side which faces the other member, said recesses being normally coaxial, a circular metallic member for and fitting within each of said recesses and adapted to turn therein, and a non-metallic resilient element connecting the said circular members and adapted to yield transversely to the normal axis of the said recesses as the said parts move relatively.

14. A resilient wheel having a hub portion and a rim portion, a pair of spaced and parallel side plates carried by one of said portions, a web projecting from the other of said portions and extending into the space between the side plates, said side plates and web being provided with circular and normally coaxial recesses in their facing sides, a circular metallic member for and fitting within each of said recesses and adapted to turn therein as the wheel rotates, the metallic members on one side of the web being paired with the corresponding metallic members on the plate on that side of the web and the metallic members on the other side of the web being paired with the metallic members on the other side plate, and non-metallic resilient elements connecting the respective pairs of metallic members and adapted to yield transversely as the hub and rim portions of the wheel move relatively to each other.

15. A resilient wheel as set forth in claim 14 in which the pair of side plates is on the hub portion and the web is on the rim portion of the wheel.

In testimony whereof I have signed my name to this application.

JAMES M. MacLEAN.